US011535959B2

(12) United States Patent
Shahkarami (10) Patent No.: US 11,535,959 B2
(45) Date of Patent: *Dec. 27, 2022

(54) WOVEN MULTI-LAYER FABRICS AND METHODS OF FABRICATING SAME

(71) Applicant: Barrday Inc., Cambridge (CA)

(72) Inventor: Shekoufeh Shahkarami, Ancaster (CA)

(73) Assignee: Barrday, Inc., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,407

(22) Filed: Jul. 31, 2020

(65) Prior Publication Data

US 2020/0354862 A1   Nov. 12, 2020

Related U.S. Application Data

(63) Continuation of application No. 15/852,074, filed on Dec. 22, 2017, now abandoned, which is a
(Continued)

(51) Int. Cl.
*D03D 11/00* (2006.01)
*D03D 25/00* (2006.01)
(Continued)

(52) U.S. Cl.
CPC .......... *D03D 1/0052* (2013.01); *B32B 5/024* (2013.01); *B32B 5/06* (2013.01); *B32B 5/08* (2013.01);
(Continued)

(58) Field of Classification Search
CPC .... D03D 11/00; D03D 25/005; D03D 13/004; D03D 1/0052; D03D 13/00; D03D 15/00;
(Continued)

(56) References Cited

U.S. PATENT DOCUMENTS 3,719,545 A    3/1973  Lawler
4,696,853 A *  9/1987  Fourezon .............. D03D 15/00
                                                    156/148
(Continued)

FOREIGN PATENT DOCUMENTS

CA    2738987 A1    4/2011
CA    2759965 A1    5/2013
(Continued)

OTHER PUBLICATIONS

US 6,861,120 B2, 03/2005, Howland (withdrawn)

*Primary Examiner* — Robert H Muromoto, Jr.
(74) *Attorney, Agent, or Firm* — Bereskin & Parr LLP/S.E.N.C.R.L., s.r.l.

(57) ABSTRACT

A multi-layer ballistic woven fabric, including an upper woven layer having upper warp yarns and upper weft yarns that are interwoven together to form the upper woven layer. The multi-layer ballistic woven fabric also includes a lower woven layer having lower warp yarns and lower weft yarns that are interwoven together, and a plurality of securing yarns, each securing yarn interwoven with at least some of the upper yarns and some of the lower yarns so as to secure the upper and lower woven layers together. At least one of the securing yarns is woven underneath a first lower weft yarn, then above a second upper weft yarn adjacent the first lower weft yarn, then underneath a third lower weft yarn adjacent the second upper weft yarn and then above a fourth upper weft yarn adjacent the third lower weft yarn. The multi-layer ballistic woven fabric is formed by interweaving the securing yarns with the warp yarns and weft yarns as the upper woven layer and lower woven layer are made.

10 Claims, 10 Drawing Sheets

Related U.S. Application Data continuation of application No. 14/845,394, filed on Sep. 4, 2015, now Pat. No. 9,850,589, which is a continuation of application No. 14/070,798, filed on Nov. 4, 2013, now Pat. No. 9,127,379, which is a continuation of application No. 13/565,856, filed on Aug. 3, 2012, now Pat. No. 8,573,261, which is a continuation of application No. 12/897,209, filed on Oct. 4, 2010, now Pat. No. 8,256,470.

(60) Provisional application No. 61/248,123, filed on Oct. 2, 2009.

(51) Int. Cl.

| | | |
|---|---|---|
| *D03D 1/00* | (2006.01) | |
| *D03D 13/00* | (2006.01) | |
| *B32B 5/08* | (2006.01) | |
| *F41H 5/04* | (2006.01) | |
| *B32B 5/06* | (2006.01) | |
| *B32B 5/22* | (2006.01) | |
| *B32B 5/26* | (2006.01) | |
| *D03D 11/02* | (2006.01) | |
| *D03D 15/43* | (2021.01) | |
| *D03D 15/46* | (2021.01) | |
| *B32B 27/02* | (2006.01) | |
| *B32B 5/02* | (2006.01) | |

(52) U.S. Cl.
CPC .............. *B32B 5/22* (2013.01); *B32B 5/26* (2013.01); *B32B 27/02* (2013.01); *D03D 11/00* (2013.01); *D03D 11/02* (2013.01); *D03D 13/004* (2013.01); *D03D 15/43* (2021.01); *D03D 15/46* (2021.01); *D03D 25/005* (2013.01); *F41H 5/0485* (2013.01); *B32B 2250/20* (2013.01); *B32B 2260/021* (2013.01); *B32B 2260/046* (2013.01); *B32B 2262/02* (2013.01); *B32B 2262/0207* (2013.01); *B32B 2262/0238* (2013.01); *B32B 2262/0246* (2013.01); *B32B 2262/0253* (2013.01); *B32B 2262/0261* (2013.01); *B32B 2262/0269* (2013.01); *B32B 2262/04* (2013.01); *B32B 2262/06* (2013.01); *B32B 2262/08* (2013.01); *B32B 2262/10* (2013.01); *B32B 2262/101* (2013.01); *B32B 2262/106* (2013.01); *B32B 2262/14* (2013.01); *B32B 2307/54* (2013.01); *B32B 2571/02* (2013.01)

(58) Field of Classification Search
CPC . D03D 41/004; Y10S 139/01; Y10S 162/903; Y10T 442/3179; Y10T 442/3195; Y10T 428/24058; Y10T 428/24091; B32B 5/024; B32B 2262/0269; B32B 5/12; F41H 5/0485; D10B 2331/021; D10B 2403/02412
See application file for complete search history.

(56) References Cited

U.S. PATENT DOCUMENTS

| | | | |
|---|---|---|---|
| 5,085,252 A * | 2/1992 | Mohamed | D03D 41/004 139/11 |
| 5,238,728 A * | 8/1993 | Aucagne | B29C 70/24 428/109 |
| 5,456,974 A * | 10/1995 | Lundblad | D03D 11/00 139/408 |
| 5,899,241 A * | 5/1999 | David | D03D 25/005 139/408 |
| 6,155,308 A | 12/2000 | Kuji | |
| 6,227,257 B1 | 5/2001 | Griffiths | |
| 6,323,145 B1 * | 11/2001 | Popper | A41D 31/0061 428/902 |
| 6,655,416 B2 | 12/2003 | Serillon | |
| 6,837,277 B2 | 1/2005 | Troughton et al. | |
| 6,911,247 B2 | 6/2005 | Howland | |
| 7,101,154 B2 | 9/2006 | Dambrine et al. | |
| 7,340,779 B2 | 3/2008 | Chiou | |
| 7,354,875 B2 | 4/2008 | Hand et al. | |
| 7,703,481 B2 | 4/2010 | Taipale et al. | |
| 7,820,565 B2 | 10/2010 | van Heerden et al. | |
| 8,017,532 B2 * | 9/2011 | Okada | B29C 70/226 428/107 |
| 8,061,391 B2 * | 11/2011 | Dunleavy | D03D 11/00 139/383 R |
| 8,256,470 B2 * | 9/2012 | Shahkarami | B32B 5/08 139/420 A |
| 8,573,261 B2 * | 11/2013 | Shahkarami | B32B 5/08 139/420 A |
| 8,796,163 B2 | 8/2014 | Okada | |
| 9,127,379 B2 * | 9/2015 | Shahkarami | B32B 5/08 |
| 2003/0024592 A1 * | 2/2003 | Serillon | D03D 15/00 139/421 |
| 2004/0023580 A1 | 2/2004 | Hand et al. | |
| 2004/0149343 A1 * | 8/2004 | Troughton | D21F 1/0045 139/383 R |
| 2005/0084377 A1 * | 4/2005 | Dambrine | B29C 70/48 416/223 R |
| 2006/0154020 A1 * | 7/2006 | Kasuya | D04H 3/04 428/105 |
| 2008/0308171 A1 | 12/2008 | Taipale et al. | |
| 2010/0275764 A1 * | 11/2010 | Egres, Jr. | B32B 5/12 89/36.02 |
| 2010/0323574 A1 * | 12/2010 | Dunleavy | D03D 11/00 442/203 |
| 2011/0240168 A1 | 10/2011 | Shahkarami | |
| 2011/0262682 A1 * | 10/2011 | Wynn | B01D 39/083 428/91 |
| 2012/0270454 A1 | 10/2012 | Chiou et al. | |
| 2013/0071642 A1 | 3/2013 | Carbajal et al. | |
| 2014/0060302 A1 | 3/2014 | Fulcheri et al. | |
| 2014/0124085 A1 | 5/2014 | Shahkarami | |
| 2016/0244896 A1 | 8/2016 | Shahkarami et al. | |
| 2016/0289869 A1 | 10/2016 | Shahkarami | |

FOREIGN PATENT DOCUMENTS

| | | |
|---|---|---|
| EP | 1908864 A1 | 4/2008 |
| WO | 2009153120 A1 | 12/2009 |
| WO | 2009153121 A1 | 12/2009 |
| WO | 2014106838 A1 | 12/2014 |
| WO | 2015070331 A1 | 5/2015 |

\* cited by examiner

WOVEN MULTI-LAYER FABRICS AND METHODS OF FABRICATING SAME

RELATED APPLICATIONS

This application is a continuation of U.S. patent application Ser. No. 15/852,074 filed Dec. 22, 2017, which is a continuation of U.S. patent application Ser. No. 14/845,394 filed Sep. 4, 2015 (U.S. Pat. No. 9,850,598), which is a continuation of U.S. patent application Ser. No. 14/070,798 filed Nov. 4, 2014 (U.S. Pat. No. 9,127,379), which is a continuation of U.S. patent application Ser. No. 13/565,856 filed Aug. 3, 2012 (U.S. Pat. No. 8,573,261), which is a continuation of U.S. patent application Ser. No. 12/897,209 filed Oct. 4, 2010 (U.S. Pat. No. 8,256,470) and which claims the benefit of U.S. Provisional Patent Application No. 61/248,123 filed Oct. 2, 2009. The entire contents of all of these applications are hereby incorporated by reference herein in their entirety for all purposes.

TECHNICAL FIELD

The embodiments herein relate to fabrics, and in particular to woven fabrics for use in ballistic applications, and methods of making the same.

INTRODUCTION

Woven fabrics are fabrics in which two distinct sets of yarns are interwoven with each other to form the fabric. Typically, woven fabrics include warp yarns that run lengthwise along the fabric and weft yarns that run across the length of the fabric, and which are interwoven with and generally perpendicular to the warp yarns.

In some ballistic applications, it is desired that two or more layers of woven fabrics be secured together. Conventionally, this may be done by providing the woven fabrics separately and then combining them to produce a multi-layer structure. For example, various fabric layers may be laid up and then joined together by resin. However, there are a several disadvantages to this technique. Firstly, since the woven fabrics are manufactured separately, this tends to result in higher associated costs. Furthermore, there may be issues related to the compatibility of the added resin to the fabric, or various types of ballistic threats which it might be subject to. Finally, there tend to be increased labor costs associated with laying up the layers of fabric.

In other known fabrics, multiple layers of woven fabric may be stitched together after being manufactured as separate layers. However, there tends to be a number of drawbacks with stitching layers together. Since stitched fabrics use needles that penetrate through the layers of yarn, gaps may be formed where the stitches are provided. Furthermore, the penetration of the needles may cause damage to the yarns. Both of these results are generally undesirable.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
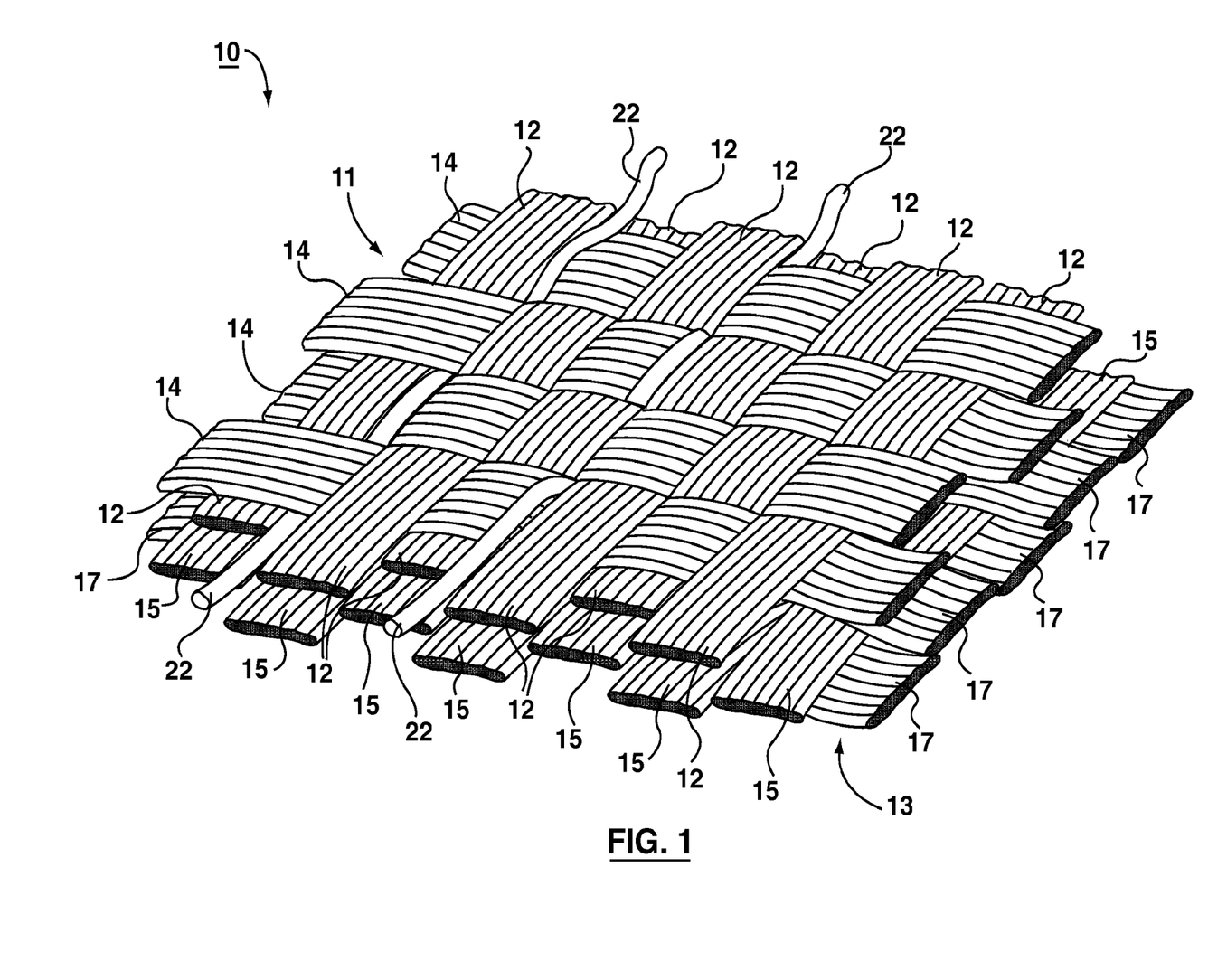
FIG. 1 is an overhead perspective view of a multi-layer woven fabric according to one embodiment.
Figure 2:
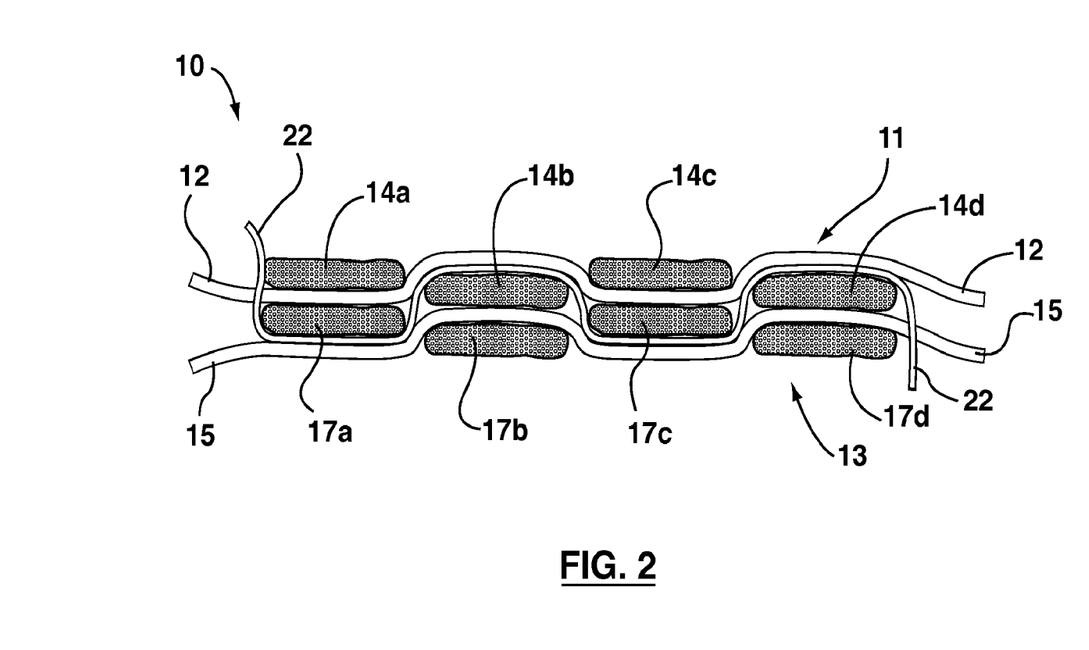
FIG. 2 is a cross-sectional side view of the multi-layer woven fabric of FIG. 1.

Generally illustrated in FIGS. 1 and 2 is a multi-layer fabric 10 according to one embodiment.

The fabric 10 has a first (or upper) woven layer indicated generally as 11. The upper woven layer 11 includes first (or upper) warp yarns 12 and first (or upper) weft yarns 14 (e.g. 14a, 14b, 14c, 14d) that are interwoven together to form the first or upper woven layer 11. The first warp yarns 12 and first weft yarns 14 in the upper woven layer 11 are crimped, in the sense that each first yarn 12, 14 is bent around the other first yarns 12, 14 at crossover points or nodes to provide an interlocking or interwoven structure.

The fabric 10 also has a second (or lower) woven layer indicated generally as 13. The lower woven layer 13 includes second (or lower) warp yarns 15 and second (or lower) weft yarns 17 (e.g. 17a, 17b, 17c, 17d) that are interwoven together to form the second or lower woven layer 13. The second warp yarns 15 and second weft yarns 17 in the second layer 13 are crimped, in the sense that each second yarn 15, 17 is bent around the other yarns 15, 17 at crossover points or nodes to provide an interwoven structure.

It will be appreciated that the terms "upper" and "lower" as used herein are used for convenience only, and the actual relative positions of the first or upper woven layer 11 and the second or lower woven layer 13 may be varied.

Generally the yarns of one layer are not interwoven with the yarns of another layer because such interweaving tends to increase the degree of crimp for the yarn in relation to rest of the yarns in the fabric, which can create ballistic weak points. In particular, the first or upper yarns 12, 14 are not interwoven with the second or lower yarns 15, 17, and vice versa. Instead, as shown, the first or upper layer 11 and second or lower layer 13 are secured together by one or more securing yarns 22. The securing yarns 22 are interwoven with at least some of the upper yarns 12, 14 and some of the lower yarns 15, 17 so as to secure the upper and lower layers 11, 13 together.

The securing yarns 22 generally form part of the woven fabric 10. In particular, the woven fabric 10 is formed by interweaving the securing yarns 22 with the warp yarns 12, 15 and weft yarns 14, 17 as the fabric 10 is formed. Therefore, the upper and lower woven layers 11, 13 can be secured together without the need for stitching, resin or other mechanisms to join the woven layers 11, 13 together.

In this manner, a fabric 10 having two (or more) woven layers 11, 13 can be manufactured as a unified construction, without the need for joining two different fabric layers together after being formed individually.

Manufacturing the fabric as a unified construction also tends to provide a lower crimp level for each layer, which tends to maintain or improve potential ballistic performance of the individual layers while achieving additional advantages associated with securing the layers together, such as higher integrity, enhanced trauma and overall ballistic performance as well as manufacturing advantages.

As shown, in some embodiments the securing yarns 22 may be aligned with the warp or weft yarns. For example, the securing yarns 22 may be generally parallel to or aligned with the warp yarns 12, 15 and generally perpendicular to the weft yarns 14, 17. In other embodiments, the securing yarns 22 may be generally parallel to or aligned with the weft yarns 14, 17 and generally perpendicular to the warp yarns 12, 15. In yet other embodiments (e.g. as shown in FIG. 3), securing yarns 22 may be provided in both the warp and weft directions (e.g. in a checker pattern) with at least some securing yarns 22 parallel to the warp yarns 12, 15 while at least some other securing yarns 22 are parallel to the weft yarns 14, 17.

Turning now specifically to FIG. 2, illustrated therein is a cross-sectional side view of the woven multi-layer fabric 10. As shown, (from left to right on FIG. 2) one of the securing yarns 22 extends from above the upper layer 11 and passes underneath a first lower weft yarn 17a (of the lower weft yarns 17), then over a second upper weft yarn 14b (of the upper weft yarns 14, and generally next to or adjacent the first lower weft yarn 17a), then underneath a third lower weft yarn 17c (generally next to or adjacent the second upper weft yarn 14b), and then above a fourth upper weft yarn 14d (generally next to or adjacent the third lower weft yarn 17c) and then extends below the lower layer 13. In this manner the securing yarn 22 tends to secure the upper weft yarns 14 and the lower weft yarns 17 together, thus joining the first woven layer 11 and the second woven layer 13.

While the illustrated embodiment shows a securing yarn extending over and under one weft yarn at a time, in other embodiments, the securing yarns may extend over or under more than one weft yarn at a time. For example, the securing yarns may be woven underneath two weft yarns, and then above five upper weft yarns adjacent the lower weft yarns. Accordingly, the securing yarns may be woven underneath at least one lower weft yarn, and then above at least one upper weft yarn adjacent the at least one lower weft yarn.

In some embodiments, one or more of the warp yarns 12, 15 and/or weft yarns 14, 17 could be used in addition to, or in place of, one or more securing yarns 22 for holding the two or more layers together. For example, one or more the of the warp yarns 12, 15 and/or the weft yarns 14, 17 could be interwoven along a path similar to the path of the securing yarn 22 as shown in FIG. 2 to secure the first layer 11 to the second layer 13.

Each of the warp yarns 12, 15 and weft yarns 14, 17 and securing yarns 22 may include a plurality of fibers or filaments of one or more materials as will be described in greater detail below.

In some embodiments, the selection and arrangement of the securing yarns 22 may be varied to obtain desired performance of the fabric 10. For example, the size, ratio and/or spacing of securing yarns 22 may be different in different embodiments of the fabric 10.

In some embodiments, a plurality of securing yarns 22 could be spaced apart from each other by a distance of between one inch and three inches. In other embodiments, securing yarns 22 may be spaced apart by a distance of less than one inch. In yet other embodiments, securing yarns may be spaced apart by a distance of more than three inches.

The ratio between securing yarns 22 and ballistic yarns (e.g. warp yarns 12, 15 and weft yarns 14, 17) as well as the spacing therebetween tends to depend on the desired interlayer stability (e.g. providing more securing yarns 22 and/or providing securing yarns 22 spaced closer together tend to result in a more stable fabric 10) versus the degree of interference between the woven layers 11, 13 (e.g. more securing yarns 22 tend to result in the woven portions deviating more from a conventional woven fabric, e.g. which may cause more distortion between the woven fabric layers).

In some embodiments, the securing yarns 22 are made from a high elongation yarn, a low strength, and/or a low modulus yarn, as generally described below.

In some embodiments, the warp yarns 12, 15 and weft yarns 14, 17 are ballistic yarns. For example, the warp yarns 12, 15 and weft yarns 14, 17 may be ballistic yarns having a tenacity of about 15 grams per denier and higher, and with a tensile modulus of at least about 400 grams per denier.

Some examples of suitable yarns could include carbon, basalt and glass fibers. Other examples include aramid and copolymer aramid fibers (produced commercially by DuPont and Teijin under the trade names Kevlar®, Twaron®, and Technora®), extended chain polyethylene fibers (produced commercially by Honeywell, and DSM, under the trade names Spectra®, and Dyneema®), polyethylene fibers and films produced by Synthetic Industries and sold under the trade name Tensylon®, poly(p-phenylene-2, 6-benzobisoxa-zole) (PBO) (produced by Toyobo under the commercial name Zylon®), and Liquid crystal polymers produced by Kuraray under the trade name Vectran®. Other suitable yarns may also be used.

In some embodiments, the securing yarns 22 are generally of significantly smaller denier than the warp yarns 12, 15 and/or weft yarns 14, 17 and may have significantly lower tenacities and tensile moduli. As a result, the securing yarns 22 tend to greatly reduce or eliminate undesirable deflection or distortion of the first and second layers 11, 13. In particular, the securing yarn 22 may be substantially crimped while it may be desirable to have the layers 11, 13 be as flat as possible.

In some examples, the securing yarns 22 have a tenacity of less than about 10 grams per denier, and a tensile modulus of less than about 40 grams per denier. In one example, the securing yarns 22 are made of a 78 dtex Nylon, while the warp yarns 12, 15 and weft yarns 14, 17 may be made of a 3000 denier aramid (e.g. Kevlar®).

In some examples, the denier of the securing yarns 22 may range from between about 20 denier (or less), to about 1000 denier, depending on the size of the warp yarns 12, 15 and weft yarns 14, 17, and the desired ballistic applications.

In some embodiments, the securing yarns 22 may be generally of a much smaller size than the warp yarns 12, 15 and weft yarns 14, 17. The diameter of the securing yarns 22 may be selected based on the moduli and strength parameters of the securing yarns 22. In some embodiments, where the securing yarns 22 are made of non-ballistic yarns (e.g. Nylon, etc.), it may be desirable that the securing yarns 22 be high elongation yarns that are as stretchy as possible and as small as possible.

In some examples, the securing yarns 22 may be selected from a wide range of fibers. Some suitable example fibers include natural fibers, such as cotton, wool, sisal, linen, jute and silk. Other suitable fibers include manmade or synthetic fibers and filaments, such as regenerated cellulose, rayon, polynosic rayon and cellulose esters, synthetic fibers and filaments, such as acrylics, polyacrylonitrile, modacrylics such as acrylonitrile-vinyl chloride copolymers, polyamides, for example, polyhexamethylene adipamide (nylon 66), polycaproamide (nylon 6), polyundecanoamide (nylon 11), polyolefin, for example, polyethylene and polypropylene, polyester, for example, polyethylene terephthalate, rubber and synthetic rubber and saran. Glass, carbon or any other high performance fiber may also be used.

Staple yarns may also be used and may include any of the above fibers, low denier staple yarns or any combination of these yarns. Staple yarns, by the discontinuous nature of their filaments that form the yarn, tend to have much lower tensile and modulus properties as opposed to yarns composed of continuous filaments.

The performance of the fabric 10 is generally a function of the properties of the securing yarns 22 and the warp yarns 12, 15 and weft yarns 14, 17. In ballistic fabrics, maximizing the amount of the ballistic fibres (e.g. the warp yarns 12, 15 and the weft yarns 14, 17) in a given volume tends to be beneficial, as higher fibre to volume ratio fraction generally signifies improved ballistic properties. Therefore, in some examples it may be desirable that the securing yarns 22 have a denier that is as low as practical while still being able to weave the fabric 10.

In the fabric 10, it may be desirable to minimize the weight of the securing yarns 22 as a percentage of the total weight of the fabric 10, since the securing yarns 22 may not contribute as much to the strength of the fabric 10 as the ballistic yarns (e.g. the warp yarns 12, 15 and the weft yarns 14, 17). Conversely, an increased quantity of securing yarns 22 may result in a more durable, stable fabric 10; however, the fabric 10 may tend to be heavier.

In some examples, the securing yarns 22 may be selected to have the lowest denier, and the lowest strength as practical that can be woven between the layers, and that satisfy the requirements for a particular ballistic application.

In some embodiments, two or more fabrics 10 may be joined together to form a ballistic member having four or more woven layers (e.g. two fabrics 10 may be joined using a resin, film or other suitable techniques to form a fabric that has four woven layers).

The fabric 10 may also be fabricated into a prepreg using a film or a wet resin. Depending on the application, the film or resin may be applied to one side of the fabric 10, the fabric 10 may be totally impregnated with a resin, or the film may be worked into the fabric 10. In some examples, the film or resin may be a thermoplastic or a thermoset resin. Generally, any resin or film that can be used to create a prepreg may be used with this fabric 10. In some embodiments, two or more layers of fabric 10 may be laminated together to further increase the number of layers.

In some embodiments, three or more woven layers may be secured together to form a fabric using one or more securing yarns that are interwoven as the fabric is being made.

Figure 3A:
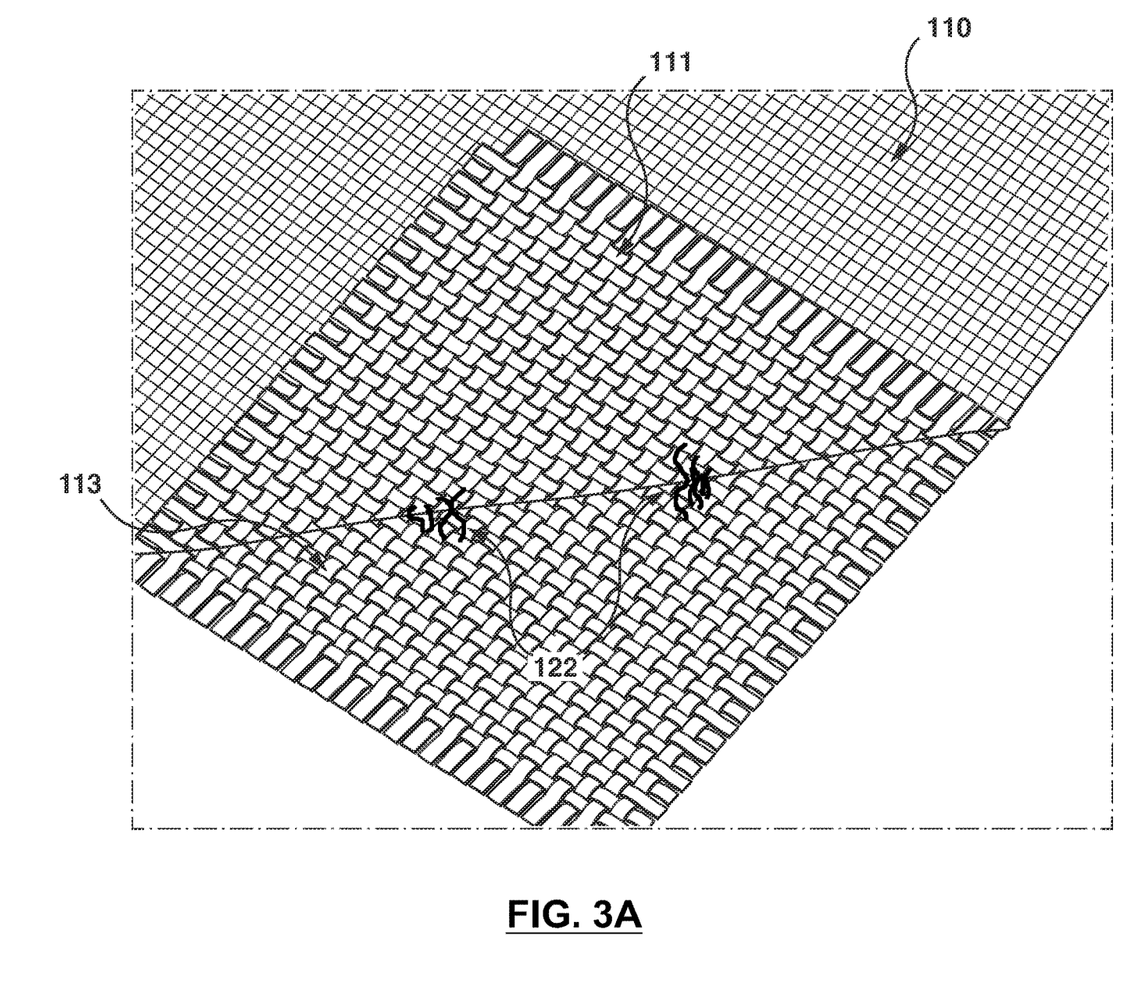
FIG. 3A is a photo of a multi-layer fabric according to another embodiment.
Figure 3B:
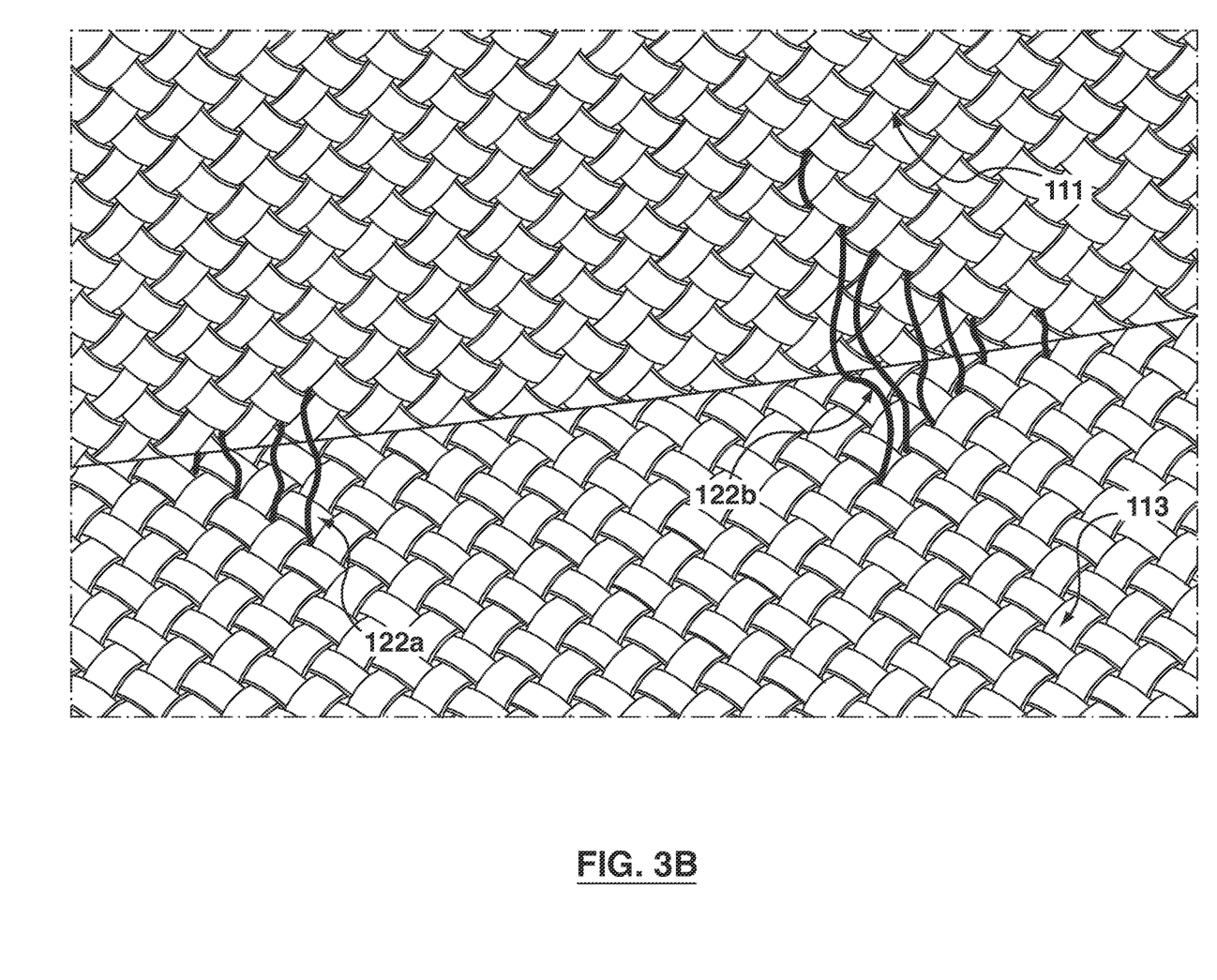
FIG. 3B is a close-up view of the photo of FIG. 3A.

Turning now to FIGS. 3A and 3B, illustrated therein is a fabric 110 according to another embodiment. The fabric 110 has a first woven layer 111 (e.g. having first interwoven warp and weft yarns) and a second woven layer 113 (e.g. having second interwoven warp and weft yarns). The first and second layers 111, 113 are secured together by securing yarns 122 that are interwoven with the first and second warp and weft yarns as the fabric 110 is woven together.

Referring now to the close up of FIG. 3B, the fabric 110 is being pulled apart to reveal the securing yarns 122 in more detail. In particular, first securing yarns 122a are oriented in a first direction (e.g. the warp direction) while second securing yarns 122b are oriented in a second direction (e.g. the weft direction).

In one exemplary embodiment, a multi-layer woven fabric according to FIGS. 3A and 3B was created and tested in a ballistic 9 mm V50 test. In particular, a woven multi-layer fabric as generally described herein made of 3360 dtex aramid was compared to a traditional fabric with separate layers laminated together using a resin. The V50 ballistic test for these fabrics were conducted in a standard setting for a 16"×16" pack using a 9 mm Remington and at 0.75 lb/ft2 for both samples, with the following results:

| Product Description | Fabric Areal Density Dry (g/m2) | Ballistic Pack Areal Density | | Ballistic 9 mm V50 | |
|---|---|---|---|---|---|
| | | (lb/ft2) | (Kg/m2) | (ft/s) | (m/s) |
| Conventional Aramid 3360 dtex 1 × 1 Plain, 2 layer laminate | 606 | 0.75 | 3.64 | 1112 | 339 |
| New Woven Multi-layer Aramid 3360 dtex 2 L Plain, 2 layer laminate | 1212 | 0.75 | 3.64 | 1125 | 343 |

As shown, the woven multi-layer fabric tends to provide similar performance as a conventional fabric while providing at least some of the advantages as generally described herein. For example, the new multi-layer fabric has gone through about half the number of processing steps in comparison to the conventional fabric, which is advantageous for both performance and cost.

In some embodiments, the multi-layer fabric might be used with a resin. If the fabric has high adhesion to the resin, the securing yarn can dissipate energy by breaking during the ballistic event while the resin keeps the other layers together and prevents trauma.

Figure 4:
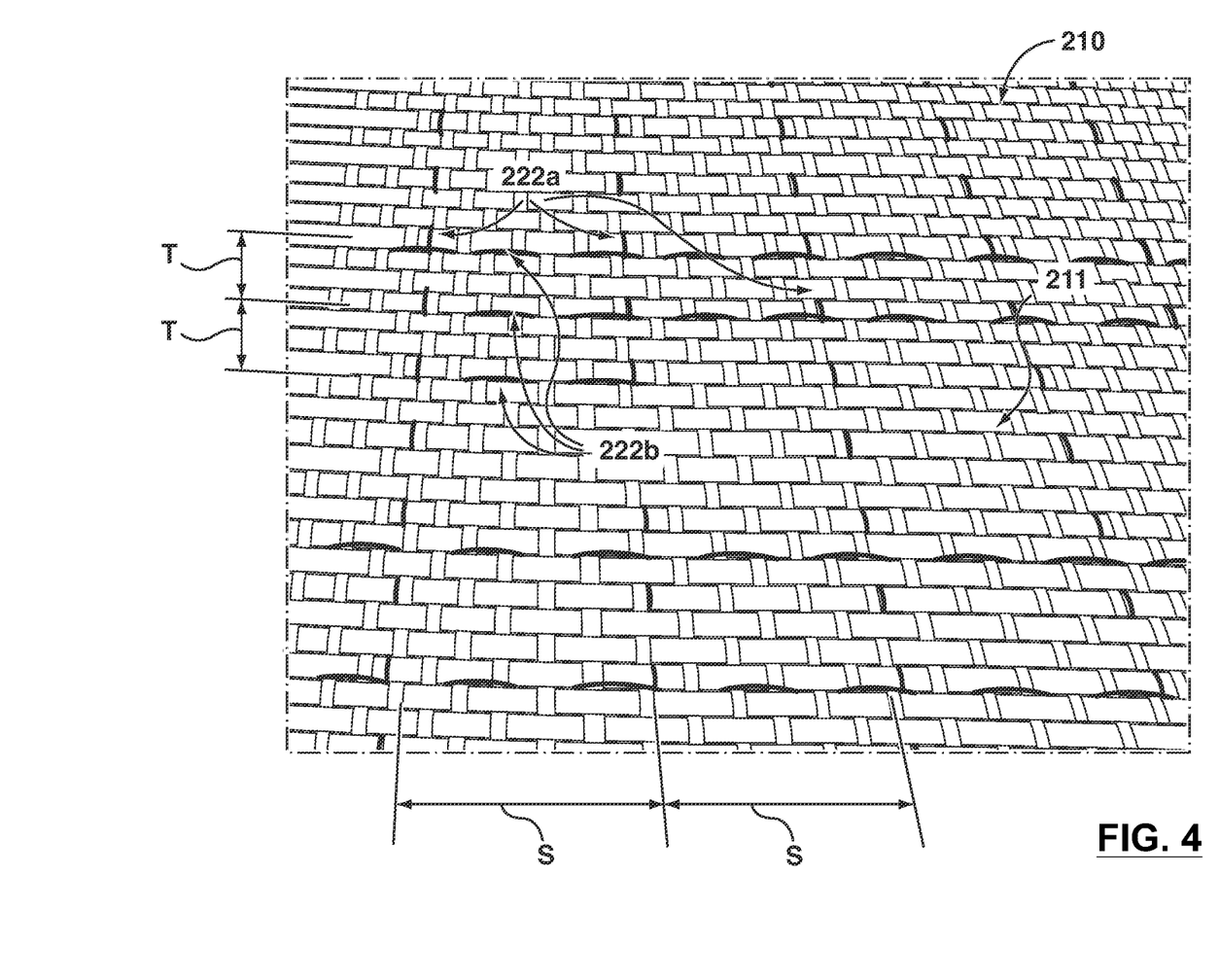
FIG. 4 is a photo of a multi-layer fabric according to yet another embodiment having an offset weave.

Turning now to FIG. 4, illustrated therein is a fabric 210 according to another embodiment in which the fabric 210 has an offset weave. In particular, the fabric 210 has two separate layers: namely a first or upper layer 211 and a second or lower layer (not shown). In this fabric 210, the upper and lower warps and wefts are offset. In particular, the upper warp yarns are not sitting on top of the lower warp yarns, but rather are sitting beside each other (e.g. are at least slightly offset), and the upper weft yarns are not sitting on top of the lower weft yarns, but rather are sitting beside each other (e.g. are at least slightly offset). This offset weave generally provides the fabric 210 with more room to spread out, resulting is less squishing or crimping of the fabric 210.

The offset design also tends to improve ballistic performance by reducing the number and/or size of openings between yarns in the fabric because the yarns of one layer cover openings in the adjacent layer, as described below.

In some ballistic applications, it is sometimes desirable to lower the cover factor of the fabric (e.g. by spacing apart yarns and providing openings therebetween) in order to increase the number of fabric layers in a pack for a given areal density. The increased number of fabric layers tends to enhance the ballistic V50 performance. However, there is a limit to the increase in performance because having a cover factor that is too low results in an open construction, which tends to increase the bullet penetration during a ballistic event and hence lowers the ballistic resistance. The offset design described above tends to enhance ballistic performance for a given yarn size and ballistic areal density by providing the layering effect while covering the openings in each layer with the yarns of the adjacent layer as the two layers are interwoven in an offset layering pattern.

In some embodiments, some of the warp yarns and/or weft yarns may at least partially overlap, which the inventor believes may tend to increase the ballistic performance.

As shown, the first layer 211 and second layer are secured together by a plurality of first securing yarns 222a and a plurality of second 222b (generally similar to the securing yarns 22 as described above) that are generally perpendicular to each other and which are arranged in an array or pattern. For example, the first securing yarns 222a may be oriented in a first direction (e.g. the warp direction), while the second securing yarns 222b may be oriented in a second direction (e.g. the weft direction).

As shown, the first securing yarns 222a may be separated from each other by a first spacing T, while the second securing yarns 222b may be separated from each other by a second spacing S. The first and second spacings T, S may be similar or different. Generally, the spacings T, S may be selected so as to obtain desired properties for the fabric 210.

In some embodiments, the first spacing T may be between one inch and three inches. In other embodiments, the first spacing T may be less than one inch, or more than three inches.

In some embodiments, the second spacing S may be between one inch and three inches. In other embodiments, the second spacing S may be less than one inch, or more than three inches.

In some embodiments, the layers of fabric may be secured using securing yarns that extend in only one direction (e.g. the weft direction only).

Figure 5:
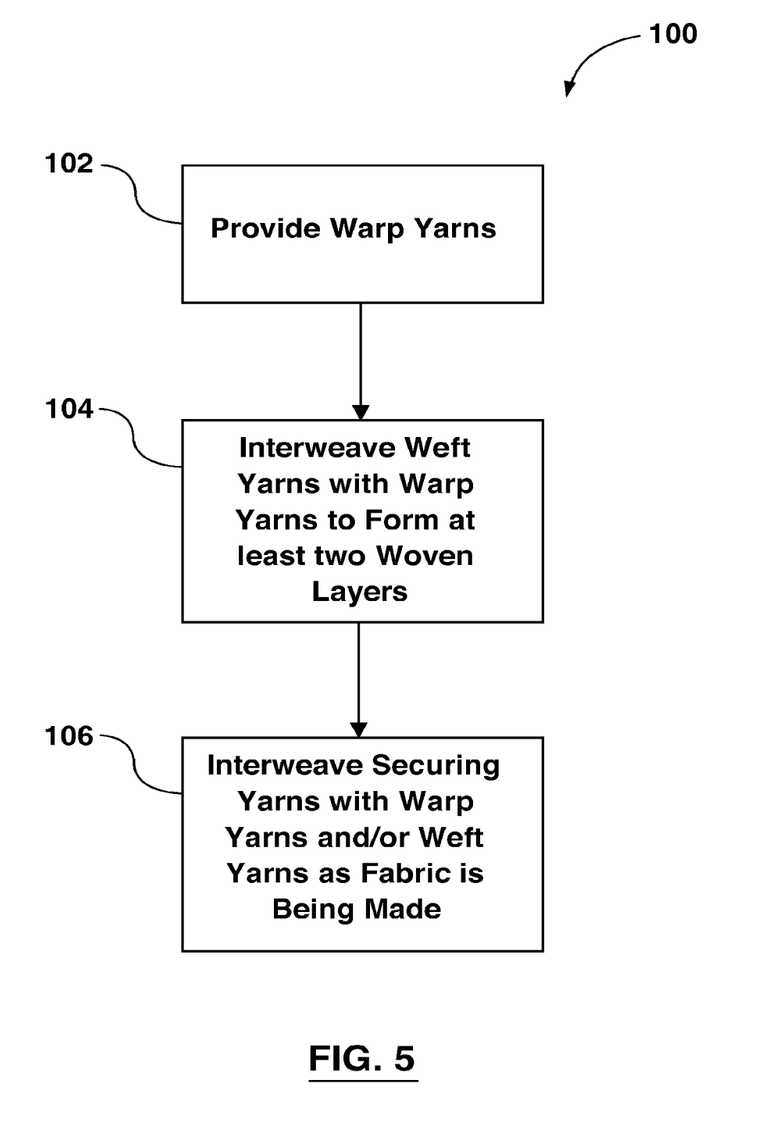
FIG. 5 is a flowchart illustrating a method of manufacturing a woven multi-layer fabric according to another embodiment.

Turning now to FIG. 5, illustrated therein is a method 100 of forming a multi-layer woven fabric according to one embodiment.

At step 102, warp yarns are provided. For example, first warp yarns 12 and second warp yarns 15 may be provided on a loom or weaving machine (e.g. standard 2D weaving looms, including rapier, shuttle, air jet and water jet looms).

At step 104, weft yarns are interwoven with the warp yarns to form at least two woven layers (e.g. a first woven layer and a second woven layer). For example, the first weft yarns 14 could be interwoven with the first warp yarns 12 by alternatively moving the first warp yarns 12 up and down and passing a shuttle with the first weft yarns 14 therebetween, as will generally be understood. Similarly, the second warp yarns 15 could be interwoven with the second weft yarns 17 to form the second woven layer 13.

At step 106, the securing yarns are interwoven with the warp yarns and/or the weft yarns as the fabric is being made (e.g. as the weft yarns and warp yarns are being woven together) to secure the first and second woven layers together. For example, the securing yarns 22 may be alternatively interwoven with the first and second warp yarns 12, 15 by selectively moving the warp yarns 12, 15 up and down and passing a shuttle with the securing yarns 22 therethrough as the warp yarns 12, 15 and weft yarns 15, 17 are being woven together.

It will be appreciated that the steps 102, 104 and 106 of the method 110 generally do not have to be done in a specific order and that the order as listed is in no way meant to be limiting.

Figure 6:
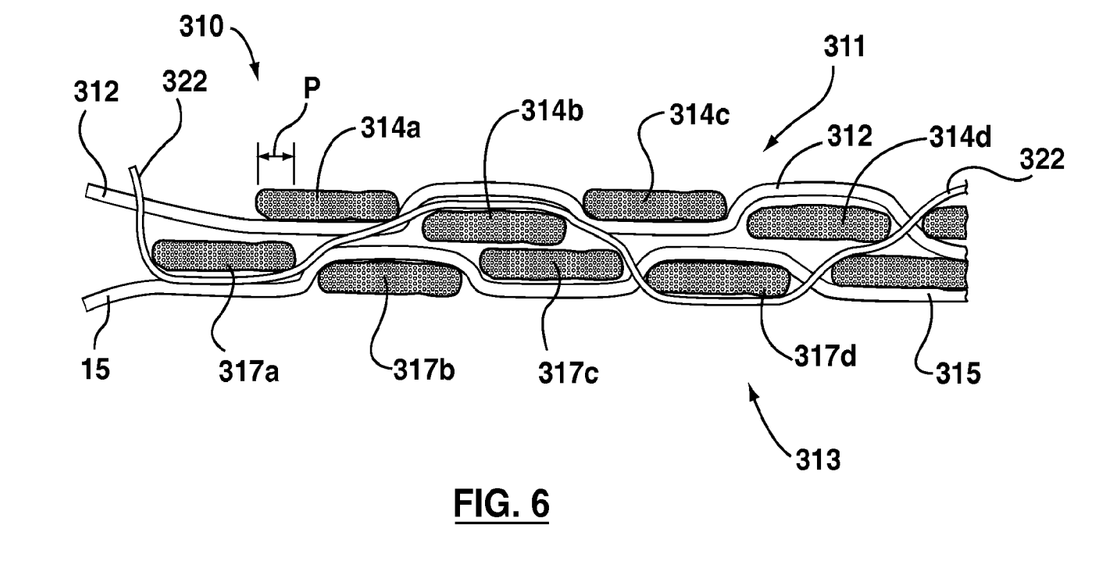
FIG. 6 is a cross-sectional side view of a multi-layer fabric having an offset weave according to another embodiment.

Turning now to FIG. 6, illustrated therein is another fabric 310 according to another embodiment having an upper layer 311 that is offset from the lower layer 313. For example, the fabric 310 may be similar to the fabric 210 described previously.

The upper woven layer 311 includes warp yarns 312 and upper weft yarns 314 (e.g. 314a, 314b, 314c, 314d) that are interwoven together to form the first or upper woven layer 311. The lower woven layer 313 includes lower warp yarns 315 and lower weft yarns 317 (e.g. 317a, 317b, 317c, 317d) that are interwoven together to form the second or lower woven layer 313. The upper and lower woven layers 311, 313 are secured together using one or more securing yarns 322 generally as described previously.

As shown, the upper weft yarns 314 and lower weft yarns 317 are offset so that, for example, the first upper weft yarn 314a overlaps the first lower weft yarn 317a by an overlap amount P. Accordingly, the securing yarn 322 tends to be less crimped and more spread out (as compared to the more compact path of the securing yarn 22 described above).

In some embodiments, the overlap amount P is between 10% and 95%. In other embodiments, the overlap amount P is between 30% and 70%. In other embodiments, the overlap amount is around 50%.

Figure 7:
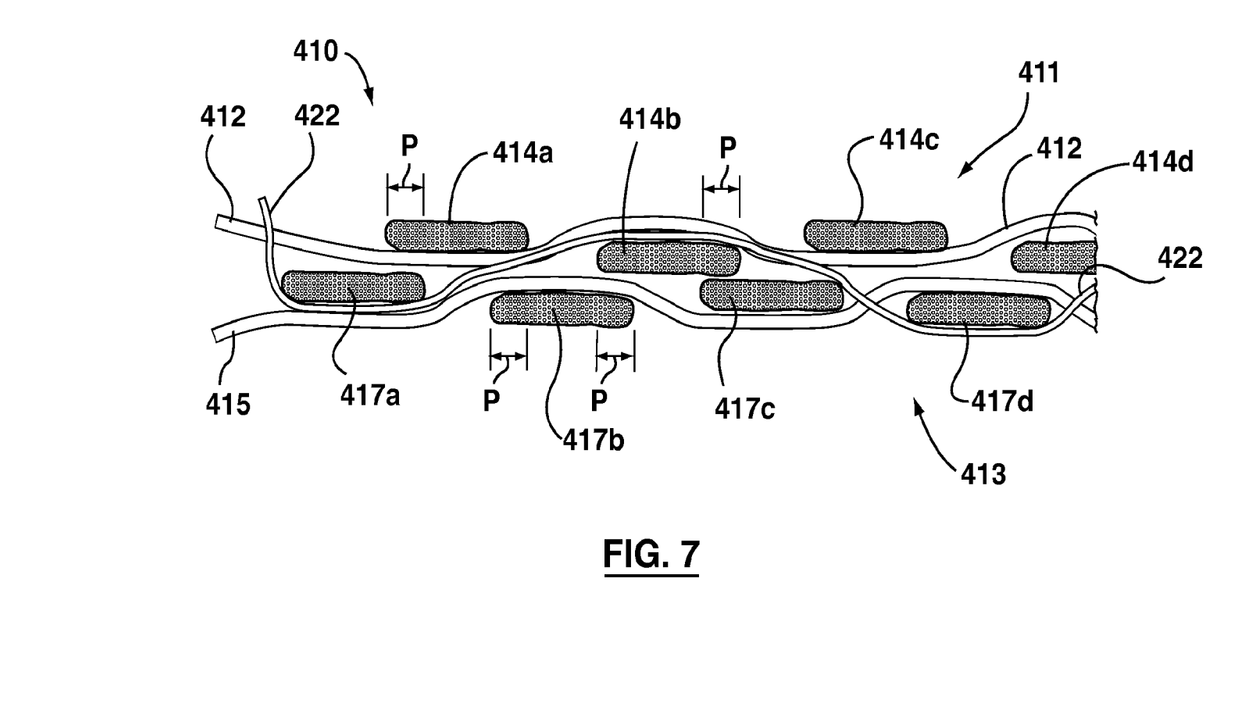
FIG. 7 is a cross-sectional side view of a multi-layer fabric having an offset weave according to another embodiment.

Turning now to FIG. 7, illustrated therein is a fabric 410 according to yet another embodiment. Fabric 410 has an upper layer 411 that is offset from the lower layer 413.

The upper woven layer 411 includes warp yarns 412 and upper weft yarns 414 (e.g. 414a, 414b, 414c, 414d) that are interwoven together to form the first or upper woven layer 411. The lower woven layer 413 includes lower warp yarns 415 and lower weft yarns 417 (e.g. 417a, 417b, 417c, 417d) that are interwoven together to form the second or lower woven layer 413. The upper and lower woven layers 411, 413 are secured together using one or more securing yarns 422 generally as described above.

As shown, the upper weft yarns 414 and lower weft yarns 417 are offset similar to the fabric 310, so that, for example, the first upper weft yarn 414a overlaps the first lower weft yarn 417a by an overlap amount P. In this embodiment, the upper weft yarns 414 and lower weft yarns 417 are generally more evenly spaced apart by the overlap distance P.

Figure 8:
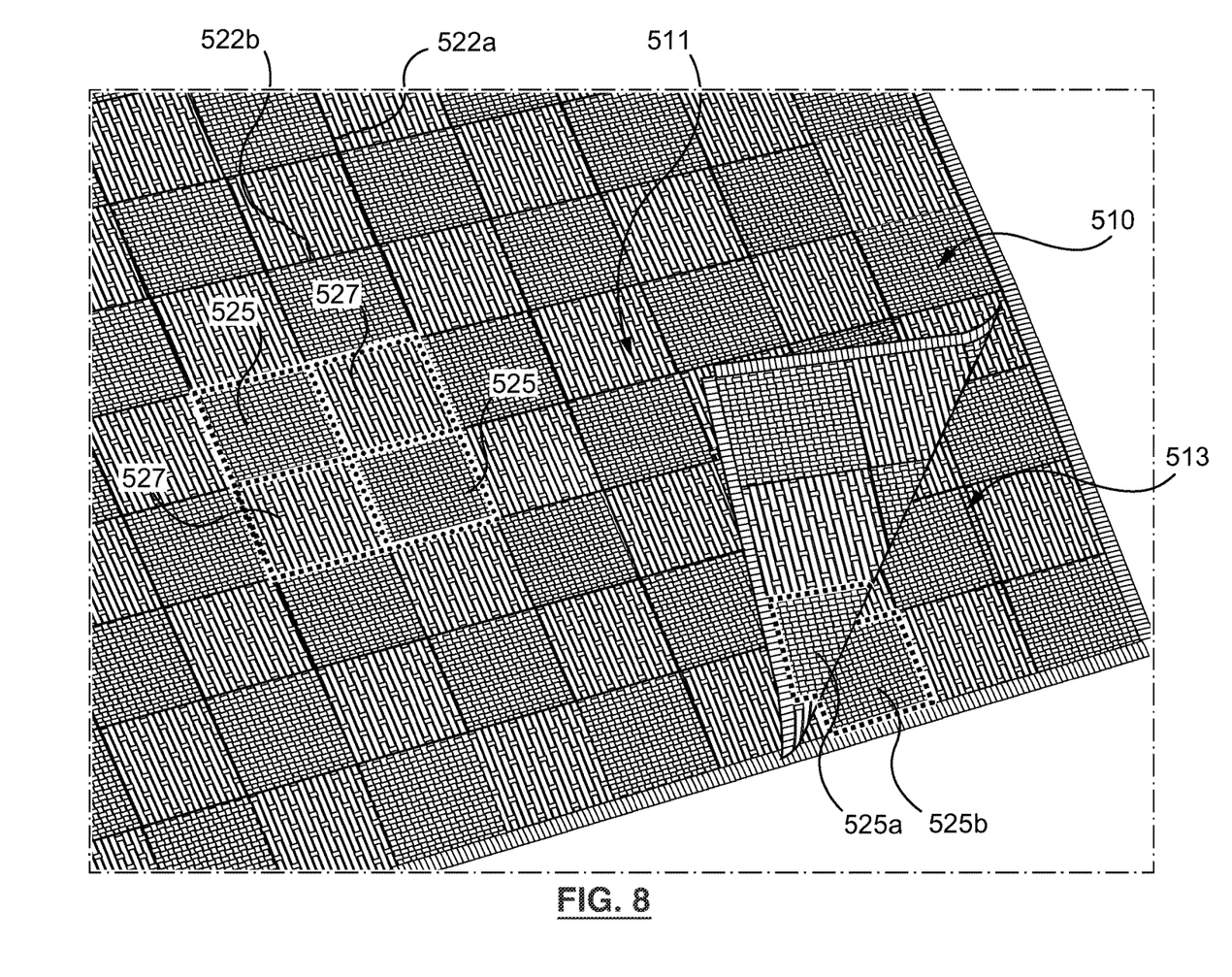
FIG. 8 is a photo of a multi-layer fabric having a plain weave and satin weave checker pattern according to yet another embodiment.

Turning now to FIG. 8, illustrated therein is a multi-lawyer woven fabric 510 according to another embodiment. The fabric 510 generally includes an upper woven layer 511 and lower woven layer 513 secured together using first securing yarns 522a and second securing yarns 522b generally as described previously. In this embodiment, the upper woven layer 511 and lower woven layer 513 each have a "checkered" pattern made up of adjacent plain woven portions 525 (e.g. portions of the layers 511, 513 with a plain weave) and satin woven portions 527 (e.g. portions of the layers 511, 513 with a satin weave). These types of woven layers may be referred to as Platin™ and are described more generally in PCT International Patent Application Publication Numbers WO2009153120 and WO2009153121.

In this embodiment, the plain woven portions 525 and satin woven portions of the upper and lower layers 511, 513 are aligned. For example, as shown a first plain woven portion 525a on the upper layer 511 is aligned with and positioned above a second plain woven portion 525b on the lower layer.

Figure 9:
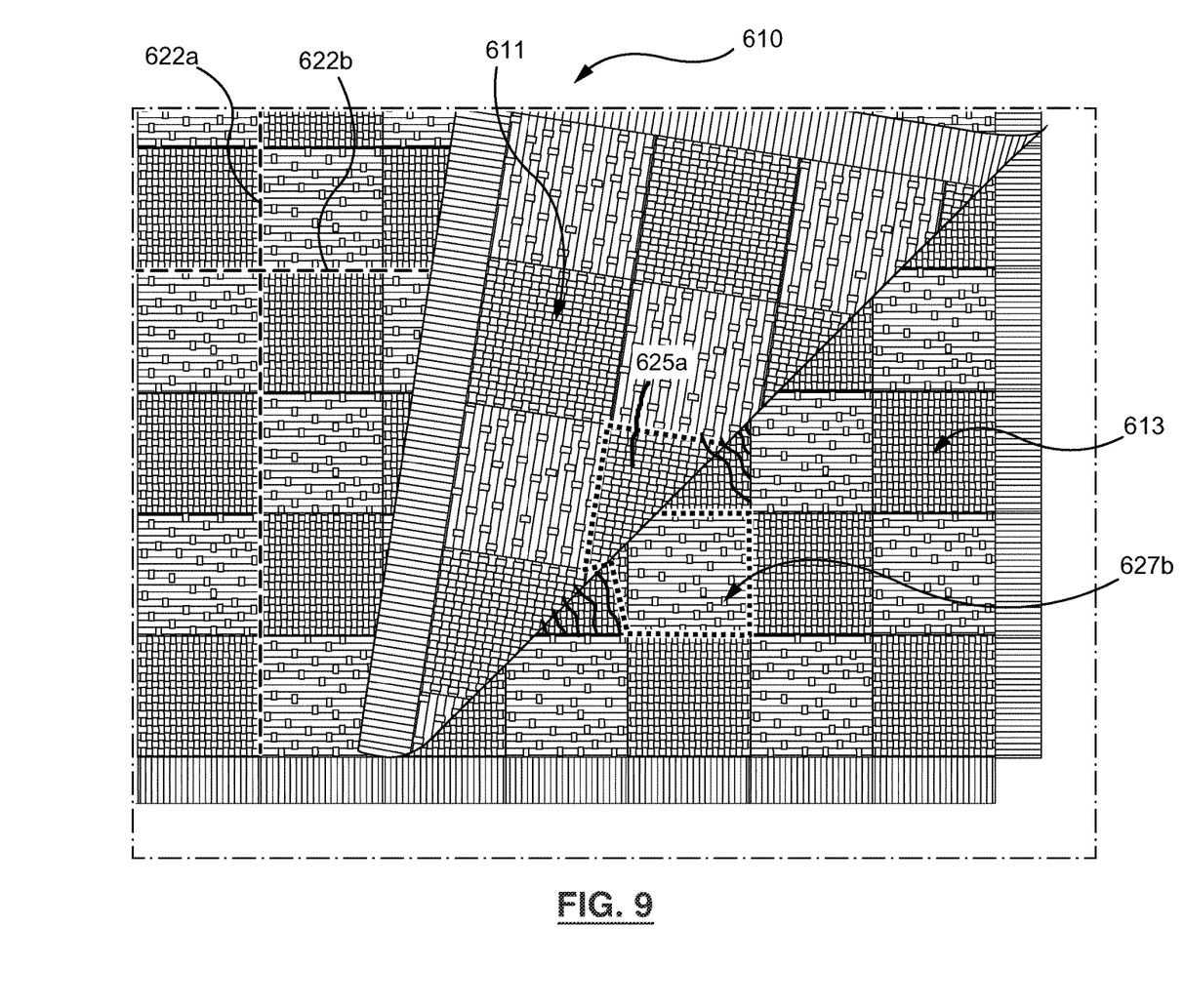
FIG. 9 is a photo of a multi-layer fabric having a plain weave and satin weave checker pattern according to yet another embodiment.

Turning now to FIG. 9 illustrated therein is a multi-lawyer woven fabric 610 according to another embodiment. The fabric 610 is similar to fabric 510 and generally includes an upper woven layer 611 and lower woven layer 613 secured together using first securing yarns 622a and second securing yarns 622b generally as described previously. However, in this embodiments the "checked" plain woven and satin portions are staggered with respect to each other. For example, as shown a first plain woven portion 625*a* on the upper layer 611 is aligned with and positioned above a second satin woven portion 627*b* on the lower layer 613.

While the embodiments of FIGS. 8 and 9 have Platin™ layers arranged so that the woven portions and satin portions are either matching or opposite, in some embodiments, the Platin™ layers may be arranged in a random design such that the woven portions and satin portions of each layer are offset from each other, opposed to being aligned in either matching or opposite patterns.

Multi-layer woven fabrics made with Platin™, and as described above, were created and tested in a ballistic 9 mm V50 test, with the following results:

| Product Description | Ballistic Pack Areal Density | | Ballistic 9 mm V50 | |
| --- | --- | --- | --- | --- |
| | lb/ft2 | Kg/m2 | ft/s | m/s |
| 2 layer Platin with matching patterns | 1.1 | 5.4 | 1505 | 459 |
| 2 layer Platin with opposite patterns | 1.1 | 5.4 | 1496 | 456 |
| 2 layer Platin with random design | 1.1 | 5.4 | 1470 | 448 |

As show, the performance of the 2 layer Platin fabric with matching patterns performed better than the other two fabrics.

In another exemplary embodiment, a multi-layer woven fabric with offset woven layers was created and tested in a ballistic 9 mm test as well as a 0.22 CAL 17 grain FSP test and compared to a plain fabric. The offset woven layers were secured together using securing yarns aligned with the weft yarns only. The securing yarns were spaced separated by a spacing of about a ¼ of an inch. The ballistic tests for these fabrics were conducted in a standard setting for a 16"×16" pack using a 9 mm Remington and a 0.22 CAL FSP at an areal density of 1.1 lb/ft2 for both samples, with the following results:

| Fabric, all greige, aramid 930 dtex | # of layers | Areal Density (of the layer) g/m$^2$ | Areal Density (of the pack) Psf | 17 grain @1.1 psf | 9 mm @1.1 psf |
| --- | --- | --- | --- | --- | --- |
| Offset | 23 | 233 | 1.10 | 654 | 521 |
| Plain Fabric | 26 | 207 | 1.11 | 622 | 502 |

The performance in the 9 mm and 0.22 CAL FSP tests were both improved. Furthermore, the performance in the 0.22 CAL FSP test was improved with the offset fabric by 33 feet, an increase of approximately 5.3%.

The new fabric with offset woven layers had a higher performance in both tests with fewer layers of fabric. This is despite the conventional understanding that a fabric having a lower cover factor and more layers of fabric for a given areal density should perform better. The inventor believes that the increased performance is due to the offset design, in which the coverage for each yarn within the fabric structure is maximized by having each direction yarn (warp or weft) sitting at two levels with overlaps.

While the exemplary embodiment tested utilized securing yarns aligned with the weft yarns and spaced apart by about a ¼ of an inch, in other embodiments, the securing yarns may be aligned with the warp yarns and/or the weft yarns, and may be separated by a spacing of less than three inches.

The fabrics described herein may generally be used in any combination with the materials listed above and may replace any one material or combination of materials in an existing ballistic fabric. In addition, the fabrics described herein may be laminated together or laminated with films to produce ballistic elements for various applications, including soft armor applications, hard armor applications, and rigid and/or semi-rigid applications. The proportions of each material selected and the design of the ballistic elements may vary depending on the intended application (i.e. particular specifications for military or police applications).

Generally, the multi-layer fabrics described herein utilize a unique technique to secure fabric layers together and limit the use of extra stitching and resin application unless desired for providing particular properties.

While the above description provides examples of one or more fabrics, processes or apparatuses, it will be appreciated that other fabrics, processes or apparatuses may be within the scope of the present description as interpreted by one of skill in the art.

The invention claimed is:

1. A multi-layer ballistic woven fabric, comprising:
   a. an upper woven layer having upper warp yarns and upper weft yarns that are interwoven together;
   b. a lower woven layer having lower warp yarns and lower weft yarns that are interwoven together; and
   c. a plurality of securing yarns, each securing yarn interwoven with at least some of the upper yarns and some of the lower yarns so as to secure the upper and lower woven layers together;
   d. wherein the multi-layer ballistic woven fabric is formed by interweaving the securing yarns with the warp yarns and weft yarns as the upper woven layer and lower woven layer are made.

2. The multi-layer ballistic woven fabric of claim 1, wherein at least some of the upper yarns and lower yarns are offset from each other so as to overlap by between 10% and 95%.

3. The multi-layer ballistic woven fabric of claim 1, wherein at least some of the upper yarns and lower yarns are offset from each other so as to overlap by between 30% and 70%.

4. The multi-layer ballistic woven fabric of claim 1, wherein at least some of the upper yarns and lower yarns are completely offset from each other so as to not overlap.

5. The multi-layer ballistic woven fabric of claim 1, wherein the warp yarns and weft yarns are ballistic yarns.

6. The multi-layer ballistic woven fabric of claim 1, wherein the securing yarns include first securing yarns oriented in a first direction and second securing yarns oriented in a second direction.

7. The multi-layer ballistic woven fabric of claim 1, wherein the securing yarns are aligned with either the warp yarns or the weft yarns, and are separated by a spacing of less than three inches.

8. The multi-layer ballistic woven fabric of claim 1, wherein the warp yarns and weft yarns have a tenacity of at least about 15 grams per denier and a tensile modulus of at least about 400 grams per denier.

9. The multi-layer ballistic woven fabric of claim 1, wherein at least one of the securing yarns is woven underneath a first lower weft yarn, then above a second upper weft yarn adjacent the first lower weft yarn, then underneath a third lower weft yarn adjacent the second upper weft yarn and then above a fourth upper weft yarn adjacent the third lower weft yarn.

10. The multi-layer ballistic woven fabric of claim 1, wherein at least one of the securing yarns is woven underneath at least one lower weft yarn, and then above at least one upper weft yarn adjacent the at least one lower weft yarn.

* * * * *